Patented Jan. 28, 1947

2,414,869

UNITED STATES PATENT OFFICE 2,414,869

PROCESS FOR THE PRODUCTION OF CELLULOSE ESTERS

Clifford I. Haney, Greenwich, Conn., and Mervin E. Martin, Cumberland, Md., assignors to Celanese Corporation of America, a corporation of Delaware No Drawing. Application October 18, 1944, Serial No. 559,242

13 Claims. (Cl. 260—230)

This invention relates to the production of cellulose acetate, or other organic acid esters of cellulose, of improved molding properties and color characteristics.

An object of this invention is to provide an improved process for the production of cellulose acetate, or other organic acid esters of cellulose, having superior molding properties and which may be molded at elevated temperatures to yield molded products of high clarity and little or no developed color.

Another object of this invention is the production of improved cellulose acetate, or other organic acid esters of cellulose, by a novel process involving filtration and extraction operations.

Other objects of this invention will appear from the following detailed description.

While our invention will be more particularly described in connection with the preparation of cellulose acetate of improved molding properties, it is to be understood, of course, that our novel process may be employed with equally valuable results in the preparation of other organic acid esters of cellulose of improved molding properties. Examples of other organic acid esters of cellulose which may be prepared in accordance with the filtration and extraction process of our invention are cellulose propionate and cellulose butyrate as well as mixed esters, such as cellulose acetate-propionate and cellulose acetate-butyrate.

Cellulose acetate and other thermoplastic organic acid esters of cellulose are extensively employed, for example, in the production of a wide variety of industrially valuable molded products. When suitably compounded with plasticizers, pigments, effect materials, and other modifying agents, the organic acid esters of cellulose may be subjected to molding operations under heat and pressure and molded articles of wide utility may be obtained. To be entirely satisfactory for the widest application, cellulose acetate which is to be subjected to molding operations must possess several important characteristics. First, it must yield clear, transparent and haze-free articles which are free of brittleness, and secondly, little or no color should develop during molding to shift the color from a clear, limpid, water-white color to a yellowish, or brownish tint. Another important factor in the production of satisfactory molding articles is the degree of stability of the cellulose acetate employed. The stability should be such that the cellulose acetate may be molded without suffering any substantial molecular degradation and consequent viscosity loss.

The process employed for esterifying the cellulose has an important bearing on the properties of the cellulose acetate produced. The various properties such as, for example, clarity, viscosity, stability and acyl value, as well as other particular properties or characteristics, may be kept to fairly close standards by conducting the esterification of the cellulose, and the ripening of the cellulose esters produced, in accordance with procedures designed to yield cellulose esters of particular physical characteristics. Attempts at controlling or eliminating those bodies which tend to impart an undesirable degree of color to clear, molded cellulose acetate materials by modifying the esterification and/or ripening procedure have not yielded entirely satisfactory results. While the exact nature and/or origin of the color-forming bodies is not known, it is essential that these bodies be removed or their effects minimized if the cellulose esters obtained are to be entirely satisfactory for molding operations.

We have now discovered that the color-forming bodies, which develop yellowish or brownish tints in clear, molded cellulose acetate or other organic acid ester of cellulose materials when the latter are subjected to molding operations may substantially be removed therefrom and clear, colorless, molded cellulose acetate materials obtained. In accordance with the process of our invention, the removal of the color-forming bodies is effected by a combination of two processing operations during the preparation of the cellulose acetate. The first of these operations comprises subjecting the cellulose acetate solution to filtration after the cellulose acetate has been ripened to the desired acetyl value and the second operation comprises subjecting the filtered cellulose acetate, after it has been precipitated from solution, washed, dried and, if desired, ground to extraction, preferably at elevated temperatures, with a non-solvent organic liquid which is a solvent for the color-forming bodies remaining and which has substantially no solvent action on the cellulose acetate. The effect of the combined operations of our novel process results in the production of cellulose acetate which is eminently suitable for molding operations. When the cellulose acetate prepared by this process is subjected to molding operations, it yields molded articles of an unusual and superior degree of freedom from developed color. The unusual degree of clarity and the substantially total lack of any developed color enables the cellulose acetate prepared in accordance with the present invention to be employed satisfactorily not only in the production of molded articles of light or pastel shades but also in the production of clear transparent molded articles where freedom from developed color is of paramount importance.

The filtration of the ripened solution of cellulose acetate may be carried out with the usual type of filter press. The filter dressing may comprise 1 to 25 layers of madapolam, muslin, cheese cloth, wood pulp, tissue paper or glass fabric. Porous stone type of filters may also be employed. The solution may be maintained under pressures of 20 to 120 lbs. per square inch during filtration. Filter aids such as cellulose fibres, glass fibres or diatomaceous earth filter aids may also be employed in some instances. One filtration is usually sufficient but 2 to 5 filtrations may be effected if desired. While the extraction of the ripened, filtered, precipitated and dried cellulose acetate may be effected in but a single step, we have found that optimum results are achieved and the color-forming bodies more completely removed by subjecting the cellulose acetate to a plurality of extractions, the extracting liquid being removed periodically and replaced by fresh extractant as the extraction proceeds.

The cellulose acetate may be prepared by acetylating cellulosic materials such as, for example, cotton, cotton linters, wood pulp, or regenerated cellulose. Prior to acetylation the cellulose may be activated by pretreatment for 1 to 5 hours with from 1 to 50%, or even 100, 200 or 300%, on the weight of the cellulose present of acetic acid or formic acid, or mixtures thereof. The pretreating acid or acids may also contain ½ to 1 or 2% on the weight of the cellulose present of sulfuric acid. The presence of sulfuric acid tends to speed up the activation. We have found that the most advantageous results are obtained where the cellulose is activated by pretreatment with a mixture of acids comprising from 5 to 20% of formic acid on the weight of the cellulose, 15 to 30% of acetic acid, 0.5 to 1.5% of sulfuric acid and from 0.5 to 2.0% of water, the pretreatment being carried out for 1 to 5 hours at 20° to 25° C. The pretreated cellulose is then reacted with acetic anhydride and sulfuric acid in appropriate amount to bring about acetylation. The sulfuric acid catalyst may be employed in amounts of from 9 to 15% or even 20% on the weight of the cellulose, of which part, as stated, is preferably introduced during pretreatment. When acetylation is complete, water is stirred into the reaction mixture to convert excess acetic anhydride to acetic acid, and, after the addition of a further amount of water, the resulting solution of cellulose acetate in acetic acid is permitted to stand or ripen whereby acetyl groups are split off and the desired solubility characteristics are reached. While ripening may be conducted at lower temperatures for extended periods, optimum results are achieved if the primary cellulose acetate is rapidly ripened at elevated temperatures to the desired solubility characteristics. We preferably ripen at temperatures of from 50 to 70° C., e. g. about 60° C., for from 3 to 8 hours. When ripening is completed, the solution is preferably diluted prior to filtration. Dilution may be effected by the addition of 70 to 110% on the weight of the solution, of aqueous acetic acid of a concentration of 20 to 50%. The dilution causes a desirable lowering of the viscosity of the solution and helps to bring into solution insoluble inorganic crystalline matter, e. g. magnesium sulfate crystals, which may form as a product of the neutralization of the sulfuric acid catalyst when ripening.

The filtration of the ripened cellulose acetate solution may be carried out at temperatures of 30 to 60° C. but optimum results are achieved when filtration is effected at temperatures of about 50° C. Following filtration, the cellulose acetate is precipitated from the filtered solution by the addition of a large excess of water or other non-solvent. The precipitated cellulose acetate is washed with water to remove as much acid and other soluble materials as possible and is then subjected to a stabilization treatment by heating it in suspension in very dilute sulfuric acid to reduce the content of combined sulfuric acid. This stabilized cellulose acetate, containing the minimum of combined sulfuric acid, is dried and is then subjected to the extraction which comprises the second operation of our novel process for the production of improved molding-grade cellulose acetate.

In accordance with the present invention, the filtered, precipitated, stabilized and dried cellulose acetate is preferably extracted with 80 to 100% ethyl alcohol as the extracting liquid. Although ethyl alcohol is preferred, other extracting liquids such as, for example, methyl alcohol or isopropyl alcohol may also be employed. Where ethyl alcohol is employed, optimum results are achieved when the extractions are effected while maintaining the alcohol at a temperature of from about 50° C. to the boiling point of the alcohol. Higher temperatures may be employed if the extraction process is carried out under super-atmospheric pressures. The temperature, however, should not be so high as to cause fusion of the cellulose acetate. The ethyl alcohol is permitted to act on the cellulose acetate for 5 minutes to 2 hours, drained therefrom and then replaced by fresh alcohol. From 2 to 8 changes of alcohol are usually sufficient to effect a satisfactory extraction of the color-forming bodies but as many as 20 changes may be necessary. In lieu of an intermittent process, a continuous extraction may be effected, the ethyl alcohol extractant being removed continuously, vaporized to separate it from the color-forming bodies, condensed, and then returned to the vessel containing the cellulose acetate being extracted whereby it may effect further extraction.

In order further to illustrate our invention but without being limited thereto, the following example is given.

*Example*

100 parts by weight of cellulose are pretreated with a mixture of 20 parts by weight of formic acid, 15 parts by weight of acetic acid, 0.5 part by weight of sulfuric acid and 0.5 part by weight of water for 3 hours at 25° C. Following this pretreatment, the activated cellulose is entered into an acetylizer containing 270 parts by weight of acetic anhydride, 310 parts of acetic acid and 11.5 parts of sulfuric acid cooled to −7° C. The temperature during the acetylation reaction is controlled so that the temperature does not rise above 38° C. Acetylation is completed in 4.5 hours. Water is added to react with any excess acetic anhydride remaining, 60% of the sulfuric acid present is neutralized and then 42 parts of water are added. The temperature of the solution is raised to above 60° C. over a period of 1 hour. 58 parts by weight of water are added and ripening is continued for a total ripening time of about 7 hours. At this point, the ripened cellulose acetate has an acetyl value of 52%. The ripened solution is then diluted with 40% aqueous acetic acid, about 105% being added based on the total weight of the ripened solution and the diluted solution is filtered. The filtration of the ripened solution is effected at a temperature of 26° C. employing a pressure of 120 lbs. per square inch through a filter dressing of 10 plies of madapolam, a cotton cloth of 50 to 60 thread count. After filtration, the cellulose acetate in the filtered solution is precipitated by the addition of a large excess of water, washed neutral to bromthymol blue indicator, washed again several times, centrifuged and dried. The dried cellulose acetate, after stabilization, is then extracted with 20 changes of 92% ethyl alcohol which is maintained at a temperature of 55° C. The extracted cellulose acetate is then dried.

When molded at 200° C. for 15 minutes this cellulose acetate yields a clear molded material possessing practically no developed color. The molded cellulose acetate transmits 70% of light of a wave length of 4400 Angstrom units and 85% of light of 6400 Angstrom units. The molded cellulose acetate possesses high impact strength and suffers little loss in viscosity which indicates a high order of stability.

It is to be understood that the foregoing detailed description is given merely by way of illustration and that many variations may be made therein without departing from the spirit of our invention.

Having described our invention, what we desire to secure by Letters Patent is:

1. In a process for the production of organic acid esters of cellulose of improved molding color wherein the organic acid ester of cellulose employed is prepared by esterifying cellulose with an organic acid anhydride in the presence of an acid esterification catalyst and the organic acid ester of cellulose is ripened to the desired acyl value, the steps which comprise filtering the solution of ripened organic acid ester of cellulose, precipitating the ripened organic acid ester of cellulose from solution, drying the organic acid ester of cellulose and subjecting the dried organic acid ester of cellulose obtained to extraction with an organic liquid having a solvent action on color-forming bodies and substantially no solvent action on the organic acid ester of cellulose.

2. In a process for the production of cellulose acetate of improved molding color wherein the cellulose acetate employed is prepared by esterifying cellulose with acetic anhydride in the presence of an acid esterification catalyst and the cellulose acetate is ripened to the desired acetyl value, the steps which comprise filtering the ripened cellulose acetate solution, precipitating the ripened cellulose acetate from solution, drying the cellulose acetate and subjecting the dried cellulose acetate obtained to extraction with an organic liquid having a solvent action on color-forming bodies and substantially no solvent action on the cellulose acetate.

3. In a process for the production of organic acid esters of cellulose of improved molding color wherein the organic acid ester of cellulose employed is prepared by esterifying cellulose with an organic acid anhydride in the presence of an acid esterification catalyst and the organic acid ester of cellulose is ripened to the desired acyl value, the steps which comprise filtering the solution of the ripened organic acid ester of cellulose, precipitating the ripened organic acid ester of cellulose from solution, drying the organic acid of cellulose and subjecting the dried organic acid ester of cellulose obtained to a plurality of extractions with an organic liquid having a solvent action on color-forming bodies and substantially no solvent action on the organic acid ester of cellulose.

4. In a process for the production of cellulose acetate of improved molding color wherein the cellulose acetate employed is prepared by esterifying cellulose with acetic anhydride in the presence of sulfuric acid as esterification catalyst and the cellulose acetate is ripened to the desired acetyl value, the steps which comprise diluting the ripened cellulose acetate solution, filtering the ripened diluted cellulose acetate solution, precipitating the ripened cellulose acetate from solution, drying the cellulose acetate and then subjecting the dried cellulose acetate to a plurality of extractions with an organic liquid having a solvent action on color-forming bodies and substantially no solvent action on the cellulose acetate.

5. In a process for the production of cellulose acetate of improved molding color wherein the cellulose acetate employed is prepared by esterifying cellulose with acetic anhydride in the presence of sulfuric acid as esterification catalyst and the cellulose acetate is ripened to the desired acetyl value, the steps which comprise filtering the ripened cellulose acetate solution, precipitating the ripened cellulose acetate from solution, drying the cellulose acetate, and then subjecting the dried cellulose acetate to a plurality of extractions with ethyl alcohol at an elevated temperature.

6. In a process for the production of cellulose acetate of improved molding color wherein the cellulose acetate employed is prepared by esterifying cellulose with acetic anhydride in the presence of sulfuric acid as esterification catalyst and the cellulose acetate is ripened to the desired acetyl value, the steps which comprise filtering the ripened cellulose acetate solution, precipitating the ripened cellulose acetate from solution, drying the cellulose acetate, and then subjecting the dried cellulose acetate to a plurality of extractions with methyl alcohol at an elevated temperature.

7. In a process for the production of cellulose acetate of improved molding color wherein the cellulose acetate employed is prepared by esterifying cellulose with acetic anhydride in the presence of sulfuric acid as esterification catalyst and the cellulose acetate is ripened to the desired acetyl value, the steps which comprise filtering the ripened cellulose acetate solution, precipitating the ripened cellulose acetate from solution, drying the cellulose acetate, and then subjecting the dried cellulose acetate to a plurality of extractions with isopropyl alcohol at an elevated temperature.

8. In a process for the production of cellulose acetate of improved molding color wherein the cellulose acetate employed is prepared by esterifying cellulose, activated by pretreatment with a mixture comprising formic acid, acetic acid and sulfuric acid, with acetic anhydride in the presence of sulfuric acid as esterification catalyst and the cellulose acetate is ripened to the desired acetyl value, the steps which comprise filtering the ripened cellulose acetate solution, precipitating the cellulose acetate from solution, drying the cellulose acetate, and then subjecting the dried cellulose acetate to a plurality of extractions with ethyl alcohol at an elevated temperature.

9. In a process for the production of cellulose acetate of improved molding color wherein the cellulose acetate employed is prepared by esterifying cellulose, activated by pretreatment with a mixture comprising formic acid, acetic acid and sulfuric acid, with acetic anhydride in the presence of sulfuric acid as esterification catalyst and the cellulose acetate is ripened to the desired acetyl value, the steps which comprise filtering the ripened cellulose acetate solution, precipitating the cellulose acetate from solution, drying the cellulose acetate, and then subjecting the dried cellulose acetate to a plurality of extractions with ethyl alcohol at an elevated temperature of at least 50° C.

10. In a process for the production of cellulose acetate of improved molding color wherein the cellulose acetate employed is prepared by esterifying cellulose, activated by pretreatment with a mixture comprising formic acid, acetic acid and sulfuric acid, with acetic anhydride in the presence of sulfuric acid as esterification catalyst and the cellulose acetate is ripened to the desired acetyl value at an elevated temperature, the steps which comprise filtering the ripened cellulose acetate solution, precipitating the cellulose acetate from solution, drying the cellulose acetate, and then subjecting the dried cellulose acetate to a plurality of extractions with ethyl alcohol at an elevated temperature of at least 50° C.

11. In a process for the production of cellulose acetate of improved molding color wherein the cellulose acetate employed is prepared by esterifying cellulose, activated by pretreatment with a mixture comprising formic acid, acetic acid and sulfuric acid, with acetic anhydride in the presence of sulfuric acid as esterification catalyst and the cellulose acetate is ripened to the desired acetyl value at an elevated temperature, the steps which comprise filtering the ripened cellulose acetate solution, precipitating the cellulose acetate from solution, drying the cellulose acetate, and then subjecting the dried cellulose acetate to a plurality of extractions with 80 to 100% ethyl alcohol at an elevated temperature of at least 50° C.

12. In a process for the production of cellulose acetate of improved molding color wherein the cellulose acetate employed is prepared by esterifying cellulose, activated by pretreatment with a mixture comprising formic acid, acetic acid and sulfuric acid, with acetic anhydride in the presence of sulfuric acid as esterification catalyst and the cellulose acetate is ripened to the desired acetyl value at an elevated temperature, the steps which comprise filtering the ripened cellulose acetate solution, precipitating the cellulose acetate from solution, drying the cellulose acetate, and then subjecting the dried cellulose acetate to a plurality of extractions with 80 to 100% ethyl alcohol at an elevated temperature of at least 50° C. for a total extraction time of from 1 to 30 hours.

13. In a process for the production of cellulose acetate of improved molding color wherein the cellulose acetate employed is prepared by esterifying cellulose, activated by pretreatment with a mixture comprising formic acid, acetic acid and sulfuric acid, with acetic anhydride in the presence of sulfuric acid as esterification catalyst and the cellulose acetate is ripened to the desired acetyl value at an elevated temperature, the steps which comprise filtering the ripened cellulose acetate solution, precipitating the cellulose acetate from solution, drying the cellulose acetate, and then subjecting the dried cellulose acetate to a plurality of extractions with 80 to 100% ethyl alcohol at an elevated temperature of at least 50° C. for a total extraction time of from 1 to 30 hours with from 2 to 20 changes of alcohol being effected in said period.

CLIFFORD I. HANEY.
MERVIN E. MARTIN.